United States Patent
Campanelli et al.

(10) Patent No.: US 8,259,387 B2
(45) Date of Patent: Sep. 4, 2012

(54) OPTICAL AMPLIFIER

(75) Inventors: Carlo Campanelli, Grumo Appula (IT);
Roberto Magri, Parma (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 238 days.

(21) Appl. No.: 12/679,971

(22) PCT Filed: Apr. 24, 2008

(86) PCT No.: PCT/EP2008/054987
§ 371 (c)(1),
(2), (4) Date: Jul. 12, 2010

(87) PCT Pub. No.: WO2009/040144
PCT Pub. Date: Apr. 2, 2009

(65) Prior Publication Data
US 2010/0284063 A1 Nov. 11, 2010

(30) Foreign Application Priority Data

Sep. 28, 2007 (EP) ..................................... 07117554

(51) Int. Cl.
*H01S 4/00* (2006.01)
*H04B 10/17* (2006.01)
*G01N 21/00* (2006.01)
*H04B 10/12* (2006.01)

(52) U.S. Cl. ..................... 359/333; 359/341.1; 356/73.1
(58) Field of Classification Search .................. 359/333, 359/341.1; 356/73.1
See application file for complete search history.

(56) References Cited

U.S. PATENT DOCUMENTS

| | | | | |
|---|---|---|---|---|
| 5,686,986 | A * | 11/1997 | Li et al. | 356/73.1 |
| 6,335,788 | B1 * | 1/2002 | Uchiyama et al. | 356/73.1 |

(Continued)

OTHER PUBLICATIONS

Cox, J.D. et al. "Optical time domain reflectometry on optical amplifier systems and its application to future optical transmission systems and networks" IEE colloquium on Optical Amplifiers for Communications (1989).*

(Continued)

*Primary Examiner* — Eric Bolda
(74) *Attorney, Agent, or Firm* — Nixon & Vanderhye P.C.

(57) ABSTRACT

An optical amplifier for determining the attenuation of a length of optical fiber (7) to which it is adapted to be connected comprising means (5) to receive an input signal from the optical fiber (7), means (6) to output an amplified signal to the optical fiber (7), a gain medium (2) and a pump means (3) arranged to generate the amplified signal from the input signal, the amplifier (1) further comprising means (13) to measure the optical power of the signal leaving the gain medium and means (14) to measure the optical power of the signal backscattered from the optical fiber (7), wherein the pump means (3) is controlled by a control means (4), the control means (4) being adapted to modulate the pump means (3) with a determination signal, the control means (4) being adapted to change the frequency of the determination signal over a plurality of determination frequencies while keeping the amplitude of the determination signal constant, the control means (4) further being adapted to calculate the attenuation of the length of the optical fiber (7) from the length of the optical fiber (7), the effective refractive index of the fiber (7), and the power of the signal from the gain medium and the power of the backscattered signal measured at each of the plurality of determination frequencies.

23 Claims, 3 Drawing Sheets

U.S. PATENT DOCUMENTS

| | | | |
|---|---|---|---|
| 6,710,863 B2 * | 3/2004 | Hotate et al. | 356/73.1 |
| 7,027,217 B2 * | 4/2006 | Kanou | 359/341.3 |
| 2002/0024655 A1 * | 2/2002 | Kimura et al. | 356/73.1 |
| 2002/0089736 A1 * | 7/2002 | Aoki et al. | 359/326 |
| 2002/0118442 A1 | 8/2002 | Ghera et al. | |
| 2004/0095569 A1 * | 5/2004 | Kan | 356/73.1 |
| 2004/0208523 A1 | 10/2004 | Carrick et al. | |
| 2008/0013162 A1 * | 1/2008 | Shukunami et al. | 359/334 |
| 2009/0097015 A1 * | 4/2009 | Davies et al. | 356/73.1 |

OTHER PUBLICATIONS

International Search Report for PCT/EP2008/054987, mailed Sep. 15, 2008.

Pierce et al., "Optical Frequency-Domain Reflectometry for Microbend Sensor Demodulation", Applied Optics, vol. 39, No. 25, Sep. 1, 2000, pp. 4569-4581, XP002493524.

* cited by examiner

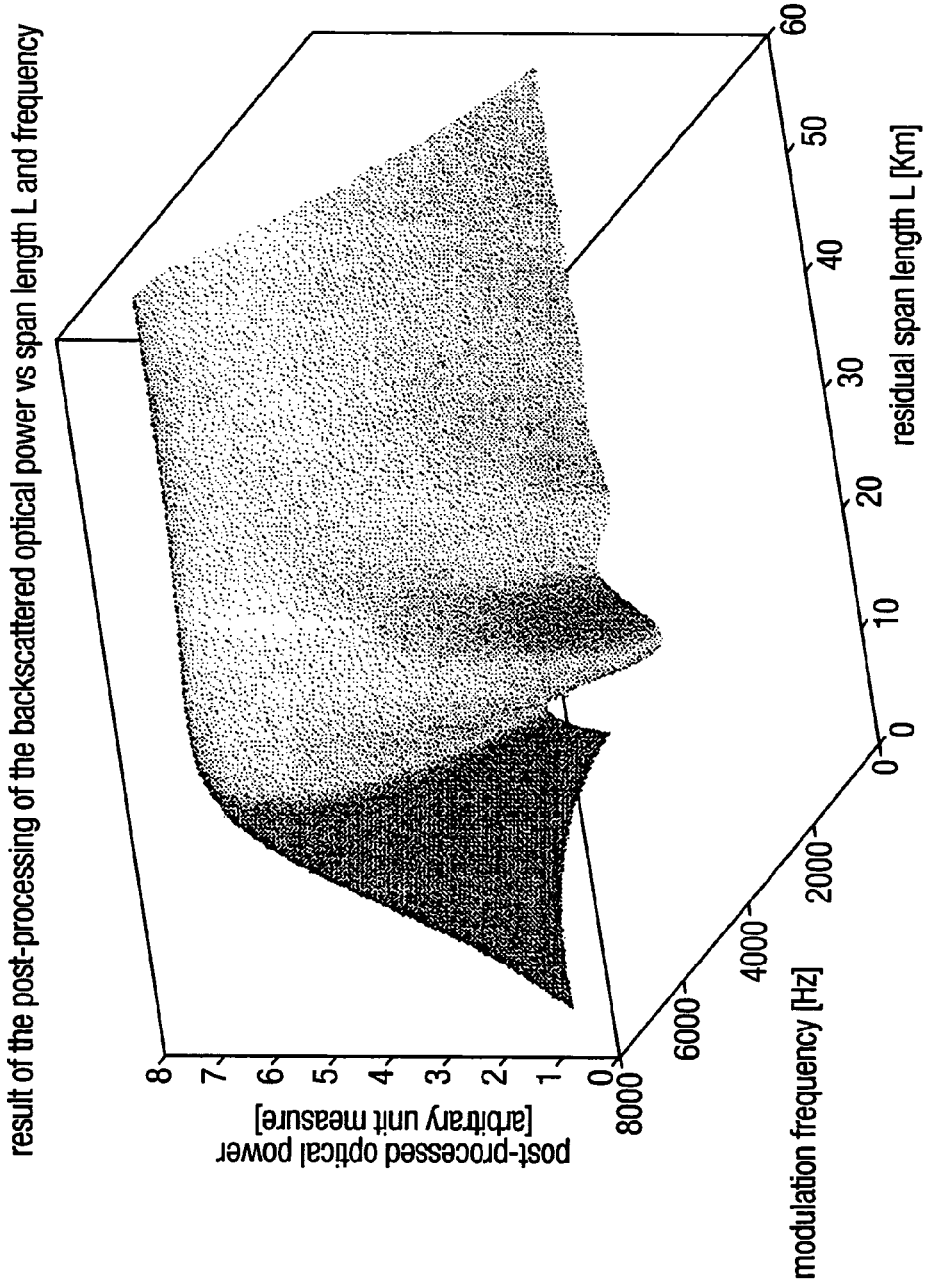

OPTICAL AMPLIFIER

This application is the U.S. national phase of International Application No. PCT/EP2008/054987, filed 24 Apr. 2008, which claims priority to European Application No. 07117554.1, filed 28 Sep. 2007, which designated the U.S. the entire contents of which are hereby incorporated by reference.

This invention relates to an optical amplifier and its mode of operation. In particular, it relates to an optical amplifier having means to measure variations in the span attenuation of an in-service network.

Optical amplifiers are used in optical based networks to amplify the optical signal to allow it to travel greater distances over links between nodes in a network. A common mode of operation for such amplifiers is constant gain, in which the required gain of the amplifier is determined during commissioning of the network and then manually set on the amplifier. The gain is calculated using the span distance to the next amplified node and the typical attenuation over that particular section of the network. Thus, the amplifier gain should compensate for the total losses between two consecutive amplifiers taking account of other components that cause attenuation such as optical add drop multiplexer filters for example. Optical amplifiers used in this mode of operation are common in metropolitan area networks (MAN), which may span several buildings or entire cities.

If such optical amplifiers are required to adapt to changes in attenuation it is indispensable to know real-time variations of the attenuation of the span between two amplified nodes for an in-service system, in order to compensate for it or to raise alarms if these variations exceed a fixed threshold. In an in-service system, the attenuation of the span can vary due to the aging of the optical fibre that carries the signal, variation of the temperature of the fibre or changes in the quality of the splices that join lengths of optical fibre together.

It is known for an optical amplifier to read the received optical power and, knowing the launched optical power, it can determine the attenuation. This method requires the use of an optical supervisory channel/system which may not be cost efficient in a MAN. Furthermore, the use of a signal degradation alarm that is only based upon variations of the input power of the amplifier in each node of the link can be problematic. This is because alarms will be raised on all amplifier nodes of the link even in cases of degradation in only one span due to either the cascading effect of the amplifiers working at constant gain or normal variations of a number of channels. Therefore an engineer must carry out analysis of the log of the alarms to discover where the degradation occurred and then manually compensate it.

A further known way of compensating for variations in attenuation in an in-service network is to use an Optical Time Domain Reflectometer (OTDR) integrated into the system. In particular, it is disclosed in WO 98/15816 the use of a dedicated out of band tone to be allocated for the OTDR. Furthermore, to prevent the out of band tone from being blocked by isolators inside the amplifier, an optical path for the backscattered power is created so as to bypass the optical amplifiers. The use of the OTDR with an out of band wavelength requires expensive modification to the network. Furthermore, the very high power and modulation of the OTDR could disturb the normal "in band" traffic due to non-linear effects in the fibre.

Further, in WO 02/47293 the function of the OTDR is disclosed as being integrated into the optical supervisory channel. Using an OTDR integrated into the optical supervisory channel requires that the customer buys this functionality and therefore increases the network costs. Furthermore, this solution requires extensive and expensive modifications to the device that manages the optical supervisory channel (OSC). In particular, such a device typically comprises a laser having a frequency of operation lower than 155 Mb/s, while the OTDR launches very short pulses of the order of nanoseconds and measures variations of the attenuation at the frequency of the OSC (typically 1510 nm) instead of the traffic band.

In the methods that use OTDR in an in-service network it is known to include a spare fibre for use by the OTDR. In practice, the span between amplifiers is realized by several optical fibers (for the two directions) inserted into a cable that may include many other fibers. Thus, one of the other fibers is used to monitor the live system. In this method it is necessary to assume that the variation in attenuation of the "monitoring" fibre is the same as that experienced by all the other fibers in the cable. The use of a dedicated fibre is expensive as that fibre could be being used to carry traffic. Further, in some networks it is not an option as a spare fibre is not always available.

An alternative means for measuring real time variations in attenuation involves the use of an Incoherent Optical Frequency Domain Reflectometer (IOFDR), as described in the S. G. Pierce, A. MacLean, and B. Culshaw, "Optical Frequency-Domain Reflectometry for Microbend Sensor Demodulation," Appl. Opt. 39, 4569-4581 (2000). This system foresees to launch a chirped optical signal and then use the backscattered signal. The attenuation of the fibre can be derived from the beat frequency of the backscattered signal.

However, this system cannot be integrated into amplifier because of the high frequencies required to generate the sinusoidal chirped signal as the amplifier has a low dynamic range if modulated by the pump laser. Furthermore, the system disclosed in the cited document is only able to detect substantially concentrated degradation of the fibre. To improve detection, the amplifier would need to be modulated with such a high modulation index that normal traffic would be disturbed.

According to a first aspect of the invention we provide an optical amplifier as defined in claim 1.

The span will typically be part of a network that the amplifier is part of. This is advantageous as the attenuation can be determined by modulating the pump means of the amplifier with a signal with a very small modulation index, to not disturb the normal traffic. This provides a cost-effective and very low impact solution for the measurement of variations of the attenuation coefficient of the optical fibre and a simple way to automatically set the amplifier gain in optical networks. Also in case of concentrated variations of the attenuation along the link (as in case of splices degradation), the invention provides a way to understand which span in a network has been subject to the degradation as an alarm will be raised on all amplifiers in the link, but only one amplifier will record a change in the attenuation coefficient of the monitored fiber.

Further, it is advantageous as no additional components are required as it is the control means that carries out the steps to derive the attenuation.

According to a second aspect of the invention we provide a method of operation of an optical amplifier as defined in claim 17.

There now follows by way of example only a detailed description of the present invention with reference to the accompanying drawings in which;

FIG. 3 shows a graph of the processed backscattered optical power with respect to span length L and modulation frequency.

Figure 1:
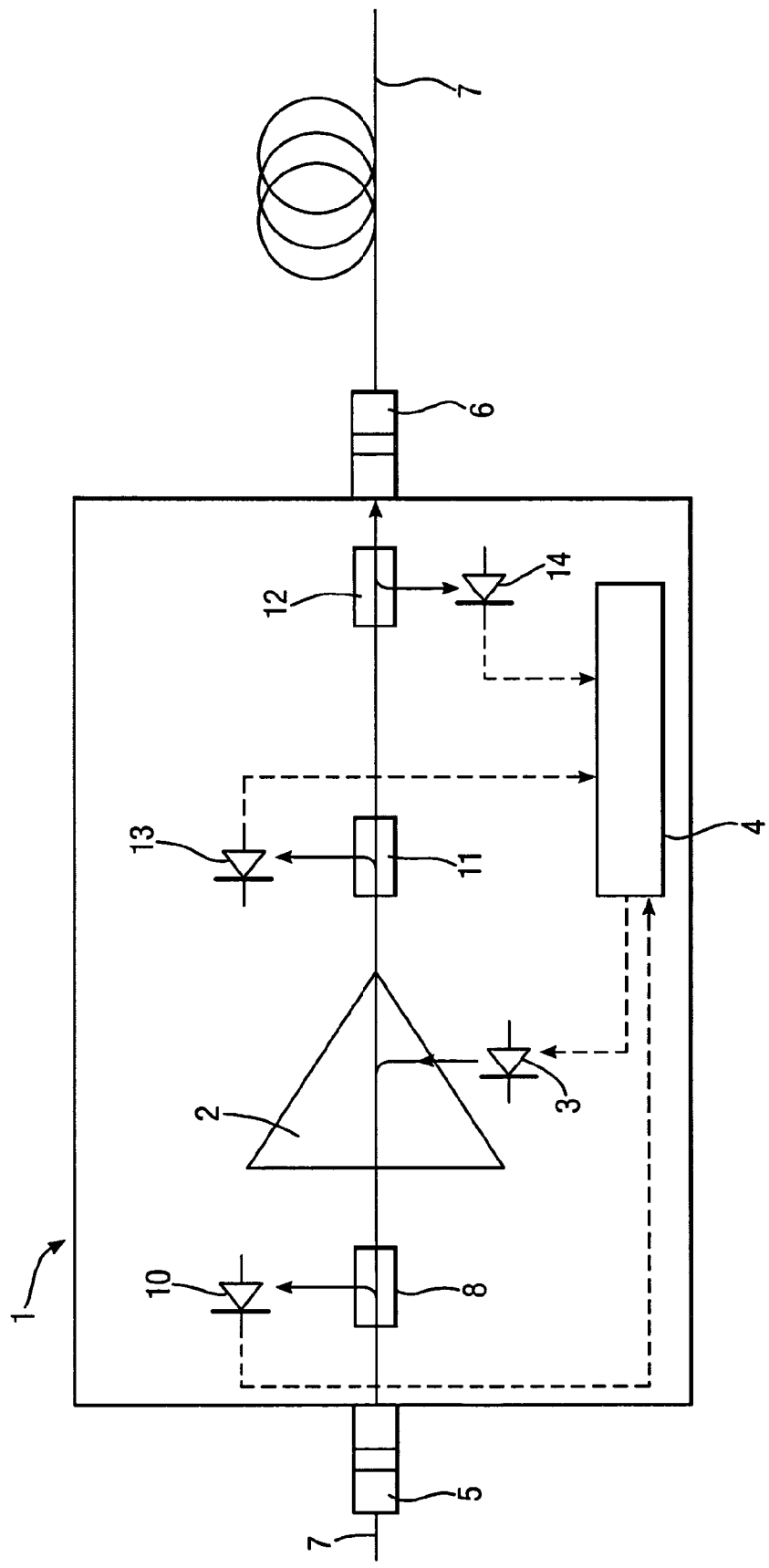
FIG. 1 shows the internal structure of an optical amplifier.

An optical amplifier 1 is shown in FIG. 1 that is adapted to measure the variations in the attenuation over a span of an in-service network. The amplifier 1 comprises a gain medium 2 and a pump means 3 that is controlled by a control means 4 in the form of microprocessor. The pump means 3 is a laser diode. An incoming signal is received through an input connector 5 and leaves the amplifier 1 through an output connector 6. The connectors 5, 6 provide an interface between the amplifier 1 and an optical fibre 7 which in the present embodiment forms the span in the network. The amplifier 1 and optical fibre 7 are arranged to operate such that the data traffic flows from left to right as shown in FIG. 1. Thus, the amplifier receives an input signal via connector 5, amplifies it and then it continues along the optical fibre 7 out of connector 6.

The amplifier 1 includes a first splitter 8 located between the input connector 5 and the gain medium 2. The splitter 8 splits the input signal to the amplifier 1 between the gain medium 2 and a first photodiode 10. The output from the first photodiode 10 is sent to the microprocessor 4. Thus, the microprocessor is able to determine the input optical power of the received signal from photodiode 10.

A second splitter 11 and third splitter 12 are located between gain medium 2 and the output connector 6. The second splitter 11 is adapted to split the output from the gain medium 2 between a second photodiode 13 and the third splitter 12. The output from the second photodiode 13 is sent to the microprocessor 4. Thus, the microprocessor 4 is able to determine the output power of signal leaving the gain medium 2 from the photodiode 13.

The third splitter 12 is oriented to split a backscattered signal received through the output connector 6 to a third photodiode 14. The output from the third photodiode is sent to the microprocessor 4. Thus, the microprocessor 4 is able to determine the optical power of the backscattered from the fibre 7 from the photodiode 14. Since the optical power backscattered from the fibre 7 is due mainly to Rayleigh backscatter, the directivity of the third splitter 12 is chosen in a suitable range. For example, for a fibre of G652 type, the Rayleigh backscatter coefficient is about 30 dB and therefore a suitable value for the directivity of the splitter 12 is at least 40 dB.

The conventional operation of such an optical amplifier 1 will not be described herein as it will be apparent to a person skilled in the art.

In use, to determine the attenuation in the fibre 7, the microprocessor 4 controls the pump means 3 such that a determination signal in the form of a sinusoidal signal is added to the continuous wave signal normally applied to the pump means 3. The determination signal is applied such that the amplifier output power measured from the second photodiode 13 has the normal continuous wave component plus the sinusoidal determination signal. The sinusoidal signal is typically of the order of a tenth of a decibel. The microprocessor 4 is adapted to keep the amplitude of this sinusoidal signal constant, while changing its frequency. The frequency of the determination signal may be changed in substantially equal steps over a range of frequencies dependant on the operating frequency of the gain medium. In the present embodiment this "determination frequency" is changed 19 times over a range of frequencies between 300 Hz and 3000 Hz.

The microprocessor 4 carries out the following steps to determine the attenuation of the link.

1) The microprocessor introduces a 90 degrees phase shift to the signal received from the second photodiode 13. This enables a clear backscattered maximum power in the frequency range of interest to be measured.

Figure 2A:
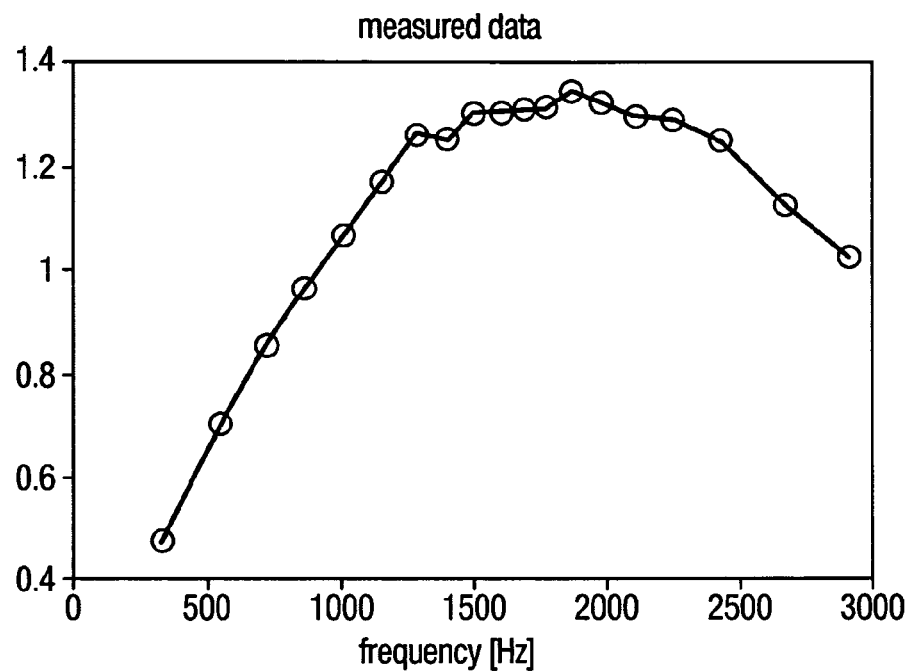
FIGS. 2a and 2b are graphs showing the data obtained by the microprocessor of the optical amplifier in FIG. 1.

2) The microprocessor 4 multiplies the signal received from the third photodiode 14 and the phase shifted signal from the second photodiode 13 and filters the result with a low pass filter. The low-pass filter is approximately 100 Hz wide. This removes the double frequency content coming from multiplication (demodulation). A typical diagram obtained by this step is shown in FIG. 2a wherein the span length is 25 Km. It is preferably that the bandwidth of the low pass filter is at least one octave lower than the minimum determination frequency used for the determination signal.

3) Steps 1 and 2 are then repeated for each determination frequency.

Figure 2B:
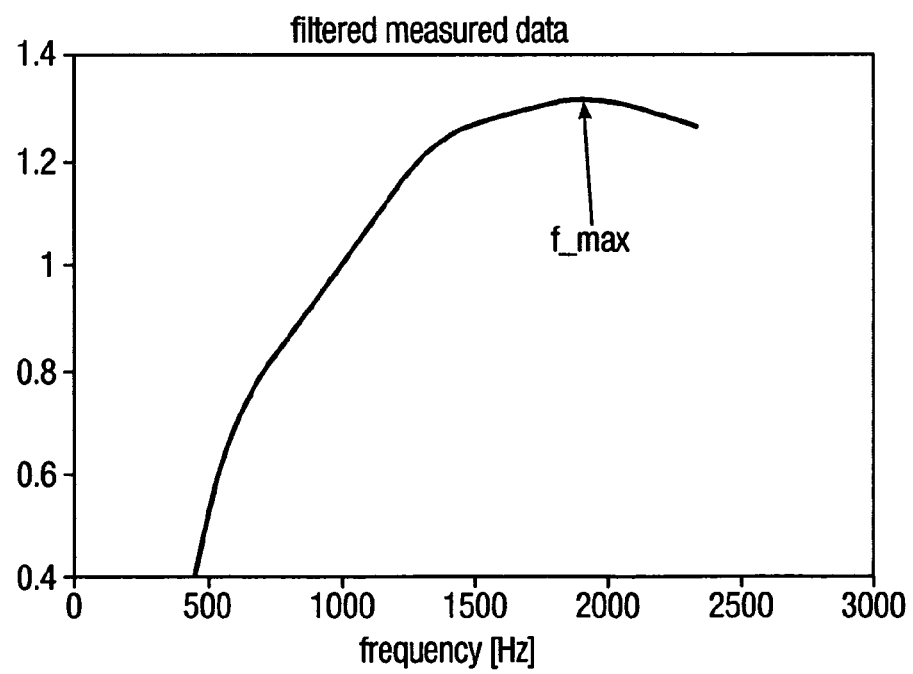

4) The microprocessor 4 therefore has a data set (represented in FIG. 2a) obtained from the above steps that is extrapolated as shown in FIG. 2a and then further filtered with a suitable low pass filter to "clean" the extrapolated data set of noise to allow the frequency corresponding to the absolute maximum of the extrapolated data set to be extracted accurately. The filtered diagram is shown in FIG. 2b. This maximum (f_max) depends on the length, on the effective refractive index and on the attenuation coefficient of the fibre of the span. Knowing the span length and the effective refractive index of the fibre, the microprocessor 4 is now able to find the value of the attenuation coefficient (or its variations with respect to an initial value measured with this system or other systems).

5) A measure of the attenuation (or its variations) is calculated using equation (1). This relation between the frequency f, the backscattered optical power and the span length is used to calculate the attenuation;

$$G(f, L, a) = \frac{\sqrt{(e^{2La} \cdot \cos(2kL) - 1)^2 + (e^{2La} \cdot \sin(2kL))^2}}{\sqrt{a^2 + k^2}} * \sin\left(-a\tan\left(\frac{k}{a}\right) + a\tan\left(\frac{e^{2La} \cdot \sin(2kL)}{e^{2La} \cdot \cos(2kL) - 1}\right)\right)$$

Equation (1)

where G(f,L,a) is the normalized back-scattered optical power, L is the length of the span, a is the attenuation coefficient in Nepers/Km and k is the wave vector corresponding to the sinusoidal determination signal (k vector includes the frequency f).

Repeating the frequency sweep for different span lengths results in a three dimensional plot as shown in FIG. 3.

The attenuation coefficient (or its variations) is then calculated by finding the zero of the non-linear equation 2:

$$f(a) = e^{-La} \cdot \sqrt{(k_{max}L)^2 + (La+1)^2} \cdot \\ \sin\left(k_{max}L + 2 \cdot \arctan\left(\frac{k_{max}}{a}\right) + \arctan\left(\frac{La+1}{k_{max}L}\right)\right) - \\ \cos\left(2 \cdot \arctan\left(\frac{k_{max}}{a}\right)\right)$$

Equation (2)

where $k_{max}$ is the wave vector corresponding to the frequency of the maximum shown in FIG. 2b, f_max. This function f(a) is proportional to the first derivative of the three dimensional function G(f,L,a) showed in FIG. 3, with respect to the frequencies axis, with fixed L and a.

This method results in a particularly accurate measure of the attenuation of the span. The precision is only limited by the optical and electrical noise experienced when the relevant measurements are made. However, by suitably selecting the two low pass filters discussed above, a level of precision can be obtained that allows the amplifier to accurately account for the real-time variations in attenuation over the span while the network is in-service.

It has been found that the solutions to f(a) of equation 2 (corresponding to the maximum of the post-processed received optical power) correspond to higher frequencies as the span length decreases. Further, amplifiers have an upper limit to their operating frequency range typically to some tens of KHz. Thus, to give a reliable indication of the attenuation of a link, the length of the fibre must be higher than a threshold value. For example, for a frequency swept having the determination signal of maximum frequency of 10 KHz, this threshold length is some Kilometers.

The measure of attenuation obtained from equation 2 is independent of the modulation index of the sinusoidal determination signal (provided that the modulation index is constant over the range of frequencies swept). If the amplitude of the sinusoidal determination signal is changed between the sets of determination frequencies that are swept, the effect is that the diagrams shown in FIGS. 2a and 2b is that the data is translated along the ordinate axis, but it will be appreciated that the frequency f_max at which the maximum occurs will remain the same.

Further, it has been found that the solutions, i.e. the zeros of the function f(a) of equation (2), do not change when the length of the fibre L is higher than approximately 70-80 Km (for a typical attenuation coefficient of about 0.2 dB/Km) because above those lengths, the backscattered optical power is too low to be accurately measured. So, to overcome this constraint, there are three possibilities:

a) Generally, an optical link is bi-directional, that is, is made by two fibers, each one for just one direction, inserted into the same cable. Furthermore, generally, a span is a maximum of 100 Km long. So, combining the measures of attenuation of both sides of the span it is possible to cover more than 100 Km of the total span. Obviously, this is reliant on the assumption that variations of the attenuation are distributed and equal for the two fibers of the cable.

b) It is possible to exploit the residual power that comes out from the input connector 5 of the amplifier 1. This power is modulated as the output power. So, the same method discussed above can be applied to the input of the amplifier 1, using the first photodiode 10 instead of the third photodiode 14. No further changes are needed to the amplifier structure shown in FIG. 1, and to the procedure described above. The measures of the two amplifiers must be done in a different time slot, so that they do not interfere with each other. In particular, the amplifier 1 is a bidirectional device and optical power leaving the gain medium 2 is substantially equal in the direction of connector 5 and connector 6. Amplifiers include isolators to prevent optical power leaving via the input connector 5. Some optical power does in practice however leak through the isolator and will flow from the gain medium 2 toward the input connector 5 and into the fibre 7 in the opposite direction with respect of the traffic channels. This power is small, but measurable, and will be backscattered from the span of fibre behind the amplifier 1. This backscattered optical power can thus be measured by the first photodiode 10. The amplifier can therefore be configured such that each amplifier will perform two measures of attenuation; one for the span in front of the amplifier measured by the third photodiode 14 and one for the span behind the amplifier 1 measured by the first photodiode 10, while modulating just its pump means 3.

c) Alternatively the structure of the amplifier 1 could be modified so that some dedicated optical output power will leave the amplifier from the input connector 5. This can then be analyzed as discussed above.

It will be appreciated that the operations that are carried out digitally by the microprocessor 4 can also be performed by equivalent analog circuits.

The invention claimed is:

1. An optical amplifier for determining the attenuation of an optical fibre that forms a span of a network to which the amplifier is adapted to be connected comprising means (5) to receive an input signal from the optical fibre (7), means (6) to output an amplified signal to the optical fibre (7), a gain medium (2) and a pump means (3) arranged to generate the amplified signal from the input signal, the amplifier (1) further comprising means (13) to measure the optical power of the signal leaving the gain medium and means (14) to measure the optical power of the signal backscattered from the optical fibre (7), wherein the pump means (3) is controlled by a control means (4), the control means (4) being adapted to modulate the pump means (3) with a determination signal, the control means (4) being adapted to change the frequency of the determination signal over a plurality of determination frequencies while keeping the amplitude of the determination signal constant, the control means (4) further being adapted to calculate the attenuation of the length of the optical fibre (7) from the length of the optical fibre (7), the effective refractive index of the fibre (7), and the power of the signal from the gain medium and the power of the backscattered signal measured at each of the plurality of determination frequencies.

2. An optical amplifier according to claim 1, in which the determination signal is sinusoidal.

3. An optical amplifier according to claim 1, in which the optical amplifier is adapted to determine the attenuation of a length of optical fibre (7) to which it is adapted to be connected while the amplifier is in-service.

4. An optical amplifier according to claim 1, in which the control means (4) is adapted to measure the difference in phase between the power of the signal from the gain medium and the power of the backscattered signal in its calculation of the attenuation.

5. An optical amplifier according to claim 1, in which the control means (4) is adapted to introduce a 90 degree phase shift in to the signal received from gain medium, then multiply this phase shifted signal with the power of the backscattered signal at each of the determination frequencies and then filter the results with a low-pass filter to form a data set and use this in the calculation of the attenuation of the fibre (7).

6. An optical amplifier according to claim 5, in which the low-pass filter is at least one octave lower than the minimum determination frequency of the determination signal.

7. An optical amplifier according to claim 5, in which the control means (4) is adapted to extrapolate the data set, filter said extrapolated data set with a low-pass filter and then determine the frequency at which a maxima (f_max) occurs and use this in the calculation of the attenuation of the fibre (7).

8. An optical amplifier according to claim 1, in which the control means (4) is arranged to determine the attenuation of the optical fibre connected to an output connector (6) of the amplifier (1).

9. An optical amplifier according to claim 1, in which the control means (4) is arranged to determine the attenuation of the optical fibre (7) connected to an input connector (6) of the amplifier (1).

10. An optical amplifier according to claim 1, in which the amplifier (1) includes a photodiode (14) arranged to measure the power of the signal backscattered from the optical fibre (7) in front of the amplifier with respect to the direction of data transmission through the amplifier.

11. An optical amplifier according to claim 1, in which the amplifier (1) includes a photodiode (10) arranged to measure the power of the signal backscattered from the optical fibre (7) behind the amplifier with respect to the direction of data transmission through the amplifier.

12. An optical amplifier according to claim 7, in which the attenuation is calculated by finding when f(a) is equal to zero, wherein;

$$f(a) = e^{-La} \cdot \sqrt{(k_{max}L)^2 + (La+1)^2} \cdot$$
$$\sin\left(k_{max}L + 2\cdot\arctan\left(\frac{k_{max}}{a}\right) + \arctan\left(\frac{La+1}{k_{max}L}\right)\right) -$$
$$\cos\left(2\cdot\arctan\left(\frac{k_{max}}{a}\right)\right)$$

and $k_{max}$ is the wave vector k at the frequency f_max where k is the wave vector corresponding to the determination signal, L is the length of the span, and a is the attenuation coefficient.

13. An optical amplifier according to claim 1, in which the determination frequencies are spread across the range of operating frequencies of the gain medium (2).

14. An optical amplifier according to claim 1, in which the plurality of determination frequencies comprise at least 10 frequencies for the determination signal.

15. An optical amplifier according to claim 1, in which the plurality of determination frequencies comprise at least 20 frequencies for the determination signal.

16. An optical amplifier according to claim 1, in which the plurality of determination frequencies are substantially 100 Hz apart.

17. A method of operating an optical amplifier (1) for calculating the attenuation of a length of optical fibre (7) to which the amplifier (1) is adapted to be connected, the optical amplifier comprising a gain medium and a pump means, the method comprising the steps of;

(a) modulating the signal output from the gain medium with a determination signal having a first determination frequency by controlling the pump means (3), (b) measuring the optical power of the backscattered signal received from the optical fibre at the frequency of the determination signal, (c) measuring the optical power of the signal output from the gain medium at the frequency of the determination signal, (d) changing the frequency of the determination signal to at least one further determination frequency and repeating steps (b) and (c); and (e) using the optical power measured in steps (b) and (c) as well as the length of the optical fibre and the effective refractive index to calculate the attenuation of the optical fibre.

18. A method according to claim 17, in which at least 10 determination frequencies are used at step (d).

19. A method according to claim 17, in which step (e) involves the step of; introducing a 90 degrees phase shift to the signal output from the gain medium in the calculation of the attenuation of the optical fibre.

20. A method according to claim 19, in which step (e) involves multiplying the backscattered signal by the phase shifted signal output from the gain medium and then filtering the result with a low-pass filter in the calculation of the attenuation of the optical fibre.

21. A method according to claim 20, in which results of the calculations performed at step (e) at each of the determination frequencies form a data set that is extrapolated and are further filtered with a low-pass filter.

22. A method according to claim 21, in which the further filtered and extrapolated results of step (e) are used in obtaining the frequency at which the absolute maximum (f_max) of the data set occurs and this frequency is used to calculate the attenuation of the optical fibre (7).

23. A method according to claim 22, in which, the method includes at step (e) calculating the measure of the attenuation of the optical fibre using;

$$G(f, L, a) = \frac{\sqrt{(e^{2La}\cdot\cos(2kL) - 1)^2 + (e^{2La}\cdot\sin(2kL))^2}}{\sqrt{a^2 + k^2}} *$$
$$\sin\left(-a\tan\left(\frac{k}{a}\right) + a\tan\left(\frac{e^{2La}\cdot\sin(2kL)}{e^{2La}\cdot\cos(2kL) - 1}\right)\right)$$

where G(f,L,a) is the normalized back-scattered optical power, L is the length of the span, a is the attenuation coefficient in Nepers/Km and k is the wave vector corresponding to the sinusoidal determination signal (k vector includes the frequency f);

and then the attenuation coefficient is calculated by finding the zero of;

$$f(a) = e^{-La} \cdot \sqrt{(k_{max}L)^2 + (La+1)^2} \cdot$$
$$\sin\left(k_{max}L + 2\cdot\arctan\left(\frac{k_{max}}{a}\right) + \arctan\left(\frac{La+1}{k_{max}L}\right)\right) -$$
$$\cos\left(2\cdot\arctan\left(\frac{k_{max}}{a}\right)\right)$$

where $k_{max}$ is the wave vector k at the frequency f_max where k is the wave vector corresponding to the determination signal and frequency of the data set at which a maxima occurs.

* * * * *

UNITED STATES PATENT AND TRADEMARK OFFICE
CERTIFICATE OF CORRECTION

PATENT NO.        : 8,259,387 B2
APPLICATION NO.   : 12/679971
DATED             : September 4, 2012
INVENTOR(S)       : Campanelli et al.

Page 1 of 1

It is certified that error appears in the above-identified patent and that said Letters Patent is hereby corrected as shown below:

In Column 2, Line 64, delete "which;" and insert -- which: --, therefor.

In Column 7, Line 39, in Claim 17, delete "of;" and insert -- of: --, therefor.

In Column 7, Line 51, in Claim 17, delete "(c);" and insert -- (c), --, therefor.

Signed and Sealed this
Fifth Day of February, 2013

Teresa Stanek Rea
*Acting Director of the United States Patent and Trademark Office*